July 15, 1969          T. A. BRATTEN          3,455,609

INERTIA SENSING PROPORTIONER

Filed Aug. 5, 1968

INVENTOR.
Thomas A. Bratten

ATTORNEY

United States Patent Office 3,455,609
Patented July 15, 1969

---

3,455,609
INERTIA SENSING PROPORTIONER
Thomas A. Bratten, Dayton, Ohio, assignor to General Motors Corporation, Detroit, Mich., a corporation of Delaware
Filed Aug. 5, 1968, Ser. No. 750,142
Int. Cl. B60t 8/12
U.S. Cl. 303—24                                4 Claims

ABSTRACT OF THE DISCLOSURE

A brake line pressure proportioning device which, after a preselected vehicle deceleration is reached, provides reduced line pressure to one of two sets of brakes, such reduction being according to a preselected reduction ratio, the fluid output of such device being limited only by the fluid input, and the ratio of output pressure to input pressure being selected to approximate the varying front-to-rear brake pressure ratio desired for optimum brake performance.

---

Figure 1:
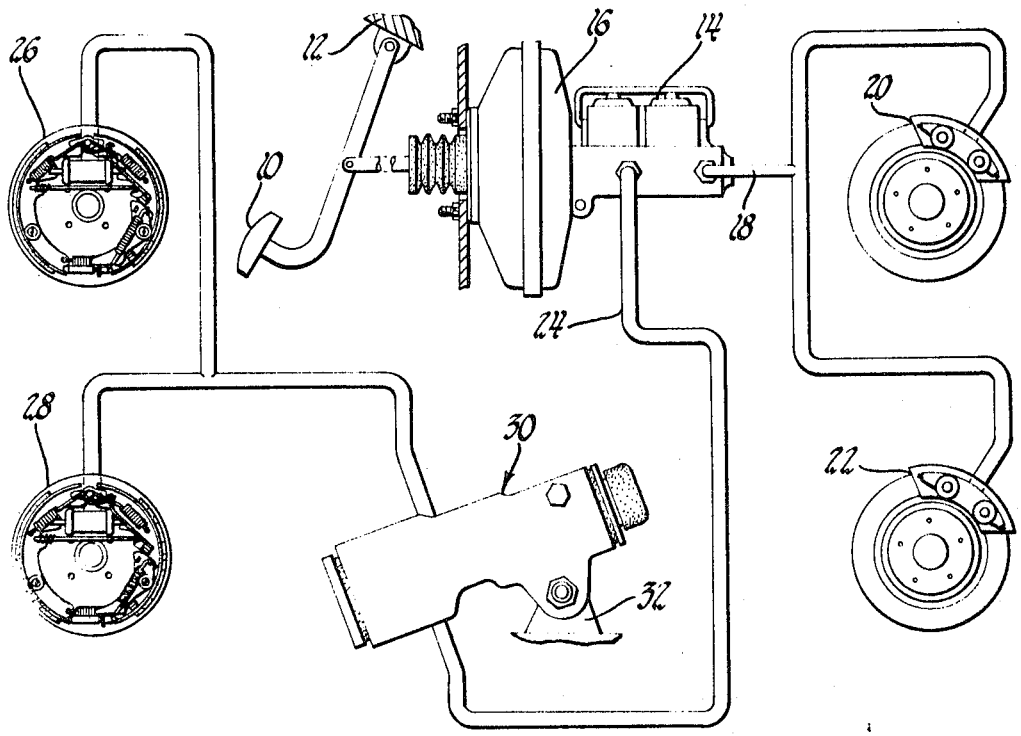

The invention relates to a hydraulic pressure control valve assembly for use in a motor vehicle hydraulic brake system and more particularly to such a valve assembly which provides an output pressure different from the input pressure in such a manner that, with proper selection of parameters, improved braking can be achieved. The principle involved is one of reducing the rear brake hydraulic pressure with reference to the front brake hydraulic pressure in such a manner that the ratio of front-to-rear brake hydraulic pressure is approximately equal to the ratio of effective vehicle weight on the front and rear wheels as this ratio varies with the deceleration of the vehicle.

Brake pressure proportioners and controllers have been proposed and utilized which provide two-stage application of pressure to the rear brakes. During the first stage, the pressure applied to the rear brakes is the same as that applied to the front brakes. At some point there is a change after which the rear brake pressure is not the same as the front brake pressure. The manner in which this change is accomplished and the operation of the devices thereafter are the major differences between various devices. Some devices determine the changeover point by a preload on a spring. The changeover point thus occurs at a particular preselected input pressure. This will not insure that the brake pressure ratio consistently approximates the dynamic weight ratio since the dynamic weight ratio of a particular vehicle is determined by the deceleration of that vehicle. A given brake line pressure does not always result in a given vehicle deceleration due to changes in vehicle loading, changes in the coefficient of friction of the road surfaces encountered at various times, and changes in the forces required to be applied to the brake shoes in order to obtain a predetermined vehicle deceleration. In some devices found in the prior art, the rear brake pressure does not continue to increase after the changeover point is passed, even though the braking effort required of the rear vehicle wheels continues to increase. In other devices the increase of rear brake pressure does not begin immediately after the changeover point occurs since the pressure increase obtained before the changeover point preloads the device so that the preload must be dissipated after the changeover point before further increase in rear brake pressure. Other devices in the prior art do not permit unlimited fluid flow therethrough while operating in the proportioning mode.

The invention herein disclosed and claimed proportions brake line pressure to one set of vehicle wheel brakes, usually the rear wheel brakes, after a preselected vehicle deceleration is reached. The proportioning is accomplished by reducing rear brake pressure at a preselected ratio of front brake pressure as applied from the master cylinder, while providing fluid output limited only by the fluid input. Brake pressure proportioning occurs immediately upon reaching the changeover point so that a continued increase in input pressure results in a continued increase in output pressure at the preselected reduction ratio.

Figure 2:
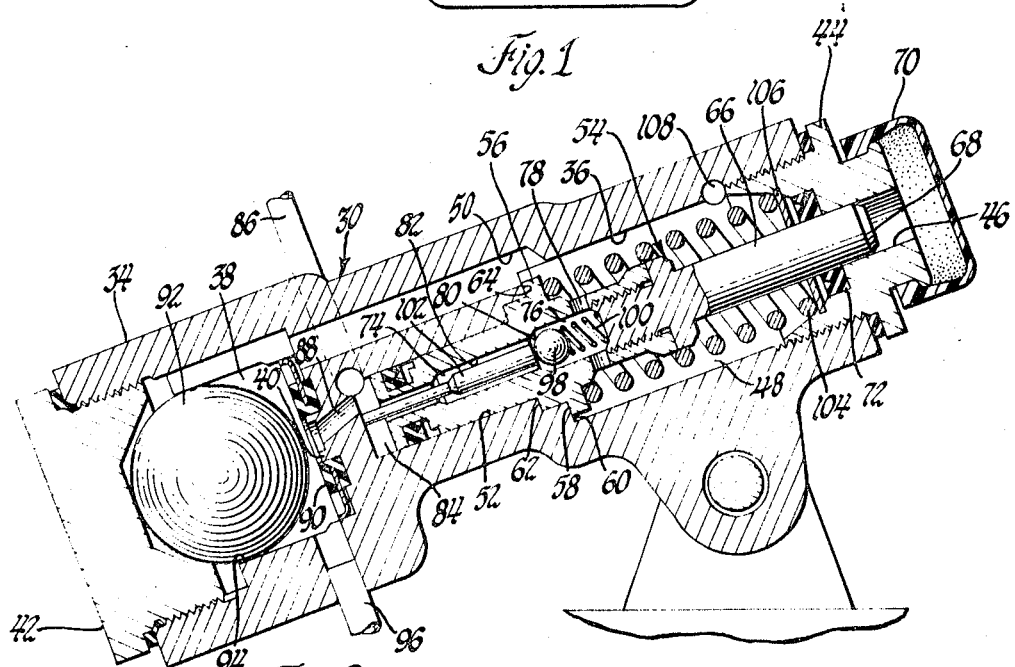

In the drawing:

FIGURE 1 is a schematic representation of a vehicle brake system embodying the invention; and FIGURE 2 is a cross section view of the proportioner positioned within the rear brake circuit of the system shown in FIGURE 1.

The brake system of the vehicle in which the proportioner embodying the invention is illustrated as being installed includes a brake pedal 10 suspended from a portion of the vehicle 12 to operate the master cylinder 14 through the brake booster mechanism 16. The master cylinder is of the dual piston and pressurizing chamber type in which the front line pressure circuit 18 for pressurizing the front vehicle brakes 20 and 22 is pressurized by one piston, and the rear brake circuit 24 is pressurized by another piston to actuate the rear brakes 26 and 28. In the brake system illustrated the front brakes are disc brakes and the rear brakes are drum brakes since this type of system is readily adapted to the use of a proportioner for the rear brakes. The proportioner 30 is positioned in the rear brake circuit 24 intermediate the master cylinder 14 and the rear brakes 26 and 28. The proportioner is illustrated as being mounted on a bracket 32 at a predetermined angle from the horizontal. If desired the mounting arrangement may be adjustable.

The proportioner 30 has a housing or body 34 provided with a bore 36 and an end chamber 38 with one wall 40 of the end chamber separating the end chamber from one end of the bore 36. The body 34 is closed at its ends by headnuts 42 and 44, headnut 42 closing end chambers 38 and headnut 44 fitting within the end of the bore 36 opposite wall 40. Headnut 44 may be considered to be a part of body 34 and is provided with a minor diameter bore section 46 which is a continuation of bore 36 and passes through the headnut. The center section of bore 36 provides an inlet pressure chamber 48 which is connected by passage 50 to the end chamber 38. The end of bore 36 adjacent wall 40 is provided with a major diameter bore section 52 of greater diameter than bore section 46 but lesser diameter than inlet pressure chamber 48.

A stepped diameter piston 54 is mounted for slidable axial movement in bore 36 and is illustrated as being formed of two sections which are fastened together. Piston section 56 has one end extending into bore section 52 and in sealing relationship therewith. A center portion of piston section 56 is enlarged to provide an annular face 58 engageable with a shoulder 60 which is provided by the diameter differences between bore section 52 and chamber 48. A two-step diameter reduction may be provided in this area by a second annular face 62 and a second shoulder 64 axially spaced from annular space 58 and shoulder 60 to provide a dashpot action preventing abrupt engagement of the annular faces with their respective shoulders when the piston moves quickly toward the left as seen in FIGURE 2. The other piston section 66 extends from chamber 48 and into bore section 46 so that its outer end 68 is exposed to atmospheric pressure at the outer end of bore section 46. A suitable dust cover 70 is provided over the open end of bore section 46. A seal 72 seals piston section 66 and headnut 44 so that pressure is retained within the inlet pressure chamber 48.

A bore 74 extends axially through a part of piston section 56 with one end terminating in a valve chamber 76, which is connected by a cross passage 78 to chamber 48. A valve seat 80 is formed on a shoulder separating valve chamber 76 from the passageway 82 which is a part of the bore 74. The other end of bore 74 from chamber 76 communicates with outlet chamber 84, formed by the end of bore 36 adjacent wall 40. The outlet port 86 is connected with outlet chamber 84. Passage 88 through wall 40 connects end chamber 38 with outlet chamber 84, opening into end chamber 38 through the center of annular valve seat 90. This valve seat is mounted on wall 40 in end chamber 38. The valve member 92 received in end chamber 38 is provided in the form of a ball valve which is capable of seating against valve seat 90 to close passage 88. Since the body 34 is normally mounted at an angle to the horizontal and pointing upwardly and forwardly of the vehicle, ball valve 92 normally rests against the inner end of the headnut 42, in spaced relation to valve seat 90. The sidewall 94 of the end chamber 38 therefore becomes a ramp up which the ball valve 92 can move under the influence of vehicle deceleration until it engages valve seat 90. An inlet port 96 is connected to the portion of the rear brake circuit 24 leading from the master cylinder 14 to communicate hydraulic brake fluid and pressure generated in the master cylinder to the end chamber 38. The outlet port 86 is connected to the portion of the rear brake circuit 24 which connects with the rear wheel brake assemblies 26 and 28.

Valve element 98 is a part of a valve mechanism contained within the piston 54. The valve element is illustrated as a ball valve contained in chamber 76 and urged toward valve seat 80 by valve spring 100. A pin 102 extends through passageway 82 of bore 74 and has one end engaging wall 40 and the other end adjacent, and under some circumstances engaging, valve element 98. Pin 102 is smaller than bore 74 so as to permit full fluid flow between inlet chamber 48 and outlet chamber 84 subject to the controlling action of valve element 98. A main spring 104 is received in inlet chamber 48 about piston 54 with one end adjacent the enlarged portion of piston section 56 on which annular face 58 is formed, and the other end engaging washer 106. The washer acts as a spring retainer and is mounted in the inner end of the headnut 44. A suitable bleed passage 108 is provided at the upper part of chamber 48 so that air may be bled from the assembly.

During light braking applications of the vehicle, when dynamic weight shift is not significant, there is free fluid pressure and fluid flow communication between the inlet port 96 and the outlet port 86. By proper selection of the main spring 104, the internal parts of the device do not move and there is no loss of fluid displacement because of the presence of the device. Brake fluid under increasing pressure passes from inlet port 96 through end chamber 38, passage 88, outlet chamber 84, and outlet port 86 to the rear brakes 26 and 28. Gravity maintains the ball valve 92 in the position shown in FIGURE 2 so that it does not close off passage 88.

When a more severe application of the brake system occurs, fluid is at first freely communicated between the inlet port 96 and the outlet port 86, as above described. Inlet pressure fluid is also communicated through passage 50 to inlet chamber 48 under these circumstances, and the pressure on the step diameter piston 54 completely surrounds that piston except for the area of end 68 exposed to atmospheric pressure in the minor diameter bore 46. The piston 54 is thus urged leftwardly, as seen in FIGURE 2, by the main spring 104, and rightwardly against the main spring by the inlet pressure acting on the piston. When the inlet pressure in chambers 48 and 84 acting over the area of minor diameter bore 46 becomes sufficient to overcome the force of main spring 104, piston 54 will move rightwardly. After a minimum amount of travel in this direction, ball valve 98 will be seated by spring 100, thus closing passageway 82 connecting chambers 48 and 84. By the proper selection of the mounted angle of the device, and the preload on main spring 104, the ball valve 92 will remain in the position shown in FIGURE 2 at least until the preload on the main spring has been overcome.

Therefore when piston 54 begins to move rightwardly, there will still be free fluid communication through passage 88 between the inlet 96 and the outlet 86.

When a sufficient vehicle deceleration is obtained the inertia of ball valve 92 will cause the valve to roll rightwardly up the ramp formed by sidewall 94 until it engages valve seat 90 and closes passage 88. At this point there will no longer be free communication between the inlet 96 and the outlet 86. Further increase in inlet pressure generated in the master cylinder 14 will increase the pressure in inlet chamber 48 since this chamber is in fluid communication with the inlet port 96 through chamber 38 and passage 50. This increased pressure will act to urge piston 54 leftwardly due to the differential areas of the major diameter bore 52 and the minor diameter bore 46. The increased pressure will thus move piston section 56 leftwardly, causing an increase in pressure in outlet chamber 84 which is less than the increase in pressure in inlet chamber 48. The pressure increase in chamber 84 will be at a ratio to the pressure increase in chamber 48 inversely to the ratio of the area of major diameter bore 52 to the difference in area between the bore 52 and the bore 46. During this pressure increase at the inlet port 96, a relative pressure drop will be caused between the end chamber 38 and the outlet chamber 84, and this relative pressure drop will assist in holding ball valve 92 against the valve seat 90.

During the leftward movement of piston 54 hydraulic fluid will be displaced from chamber 84, and the fluid so displaced will be greater in volume than the fluid entering the device through inlet port 96. The ratio of fluid displaced out of the device to that entering the device will be in direct proportion to the ratio of the area of major diameter bore 52 to the difference in area between the bores 52 and 46. The result is that any displacement lost between the successive closings of valve element 98 and valve member 92 as the piston 54 moves rightwardly will be replenished as the piston 54 moves leftwardly after the valve member 92 closes.

As piston 54 moves leftwardly, it will approach its home position in which annular face 58 engages shoulder 60. In some devices in the prior art, when the piston reaches this position, no further pressure or displacement can be obtained in the outlet chamber. In the device embodying the invention, however, this is not the case. As the piston 54 approaches its home position, the left end of the pin 102 again engages wall 40 so that the pin has no further leftward movement. Since the piston 54 moves further leftward, however, the pin 102 engages the ball valve 98 and forces this value away from its seat 80 against the pressure differential across the valve and also against the force of spring 100. At this point pressure and fluid in inlet chamber 48 will leak past the ball valve 98 and into the outlet chamber 84 through passageway 82 and thus cause a further increase in the pressure in the outlet chamber 84. There thus results a poise or balance postion where increasing pressure in inlet chamber 48 will cause an increase in pressure in outlet chamber 84 inversely according to the same ratio of the area of bore 52 to the difference in area of the bores 52 and 46, accompanied by flow of fluid from the inlet 96 to the outlet 86.

When the inlet pressure is reduced the pressure in inlet chamber 48 is likewise reduced, causing the pressure in chamber 84 to be greater than that required to maintain the piston 54 in a balanced position. Piston 54 will therefore be urged rightwardly by the pressure imbalance against the force of main spring 104. In so doing, the pressure differential ratio between outlet chamber 84 and inlet chamber 48 will remain essentially unchanged as the inlet pressure decreases, until the pressure is reached at which the ball valves 92 and 98 originally closed during the pressure increase. At this point the deceleration of the vehicle will have decreased, and without sufficient pressure differential between end chamber 38 and outlet chamber 84, the ball valve 92 is moved by gravity away from the valve seat 90. This opens passage 88, and there is once again free communication between end chamber 38 and outlet chamber 84 through passage 88. Further decrease of inlet pressure will allow a corresponding decrease in outlet pressure. Immediately before the point where the inlet and outlet pressures become equal, the piston 54 will be held in some balance position to the right of its home position. When the pressures become equal the main spring 104 will urge the piston 54 quickly home. The sudden homeward movement of piston 54 can generate a click-type noise as annular face 58 strikes shoulder 60. The step bore also provided by annular face 62 and cooperating shoulder 64 has a small amount of fluid trapped therein which acts as a dashpot to prevent this noise and cushion the homeward movement of piston 54.

If upon decreasing inlet pressure the ball 92 should tend to stick to the valve seat 90, the fluid in outlet chamber 84 can still escape since it will be at a somewhat higher pressure than the fluid in chamber 48 and will cause the ball valve 98 to open against spring 100, thus allowing the fluid to return.

It is not essential to operation of the device that the main spring 104 be preloaded against piston 54 with any particular load or that it hold the piston in its home position, if small losses of displacement are not significant. Under this circumstance there can be substantial clearance between the end of main spring 104 and the piston flange against which this end seats. This can result in an advantage. Since, on return, the piston 54 must move rightwardly to allow the pressure in chamber 84 to be reduced, the main spring must be overcome. Depending on the spring parameters, this may cause a slight delay in the decay of the pressure in chamber 84. If the main spring 104 is fitted loosely, this will not occur. Even though in this case the ball valve 98 may not be positively held open by pin 102, this action is not material since passage 88 will remain open until the ball valve 92 closes against seat 90.

What is claimed is:
1. A brake pressure proportioner adapted for use in a vehicle hydraulic brake system having a master cylinder for supplying hydraulic fluid under pressure to first and second sets of vehicle brakes to proportion fluid pressure supplied to one of said vehicle brake sets after a preselected vehicle deceleration is reached according to a preselected ratio of pressure reduction, said proportioner comprising:
   a housing having an axial bore and an end chamber and a wall separating one end of said bore and said end chamber;
   a stepped piston received in said bore in axially movable relation and dividing said bore into an inlet pressure chamber in fluid communication with said end chamber, an outlet pressure chamber at the end of said bore adjacent said wall, and an atmospheric pressure section at the other end of said bore;
   an annular valve seat in said end chamber on said wall and a passage through said wall opening within said valve seat for fluid communication between said end chamber and said outlet pressure chamber,
   a valve member in said end chamber and movable under the influence of vehicle deceleration to engage said valve seat and close said wall passage at and beyond a predetermined vehicle deceleration,
   said piston having a relatively large effective surface area exposed to fluid pressure in said inlet pressure chamber, a relatively smaller effective surface area exposed to fluid pressure in said outlet pressure chamber, a relatively still smaller effective area exposed to atmospheric pressure at the atmospheric pressure section of said bore, and a passage therethrough fluid connecting said inlet pressure chamber and said outlet pressure chamber;
   valve means in said piston passage for controlling the flow of hydraulic fluid between said inlet pressure chamber and said outlet pressure chamber through said piston passage and including a valve element movable to open and close and metering positions upon a movement of said piston; and
   spring means exerting a force on said piston in concert with fluid pressure in said inlet chamber and urging said piston toward the valve means open position.

2. The proportioner in claim 1 in which the predetermined vehicle deceleration causing said valve member to engage said valve seat and the required force on said spring means for movement of said piston to position said valve element in the closed position are so selected that said valve element closes said piston passage before said valve member closes said wall passage.

3. The proportioner of claim 2 in which the rate of said spring means is sufficiently high to insure closing of said valve member before said piston reaches the limit of its movement against the force of said spring means within the practical range of pressure and vehicle deceleration operation.

4. The proportioner of claim 2 in which said valve member is a ball valve and selection of the predetermined vehicle deceleration causing said ball valve to engage said valve seat is made of selecting the angle of said housing to the horizontal at which said ball valve must move up to engage said valve seat.

References Cited
UNITED STATES PATENTS 3,385,308   5/1968   Farr _____ 137—38

FOREIGN PATENTS 1,079,505   8/1967   Great Britain.

MILTON BUCHLER, Primary Examiner

J. J. McLAUGHLIN, Jr., Assistant Examiner

U.S. Cl. X.R.

137—38; 188—152; 303—6, 21

UNITED STATES PATENT OFFICE
CERTIFICATE OF CORRECTION

Patent No. 3,455,609                             July 15, 1969

Thomas A. Bratten

It is certified that error appears in the above identified patent and that said Letters Patent are hereby corrected as shown below:

Column 4, line 50, "value" should read -- valve --. Column 6 line 21, "close" should read -- closed --; line 26, "in", first occurrence, should read -- of --; line 42, "of", first occurrence should read -- by --.

Signed and sealed this 9th day of June 1970.

(SEAL)
Attest:

Edward M. Fletcher, Jr.                    WILLIAM E. SCHUYLER, JR.

Attesting Officer                              Commissioner of Patents